Aug. 11, 1931.  A. S. HOWELL  1,818,062
PHOTOGRAPHIC CAMERA
Filed June 9, 1928  3 Sheets-Sheet 2
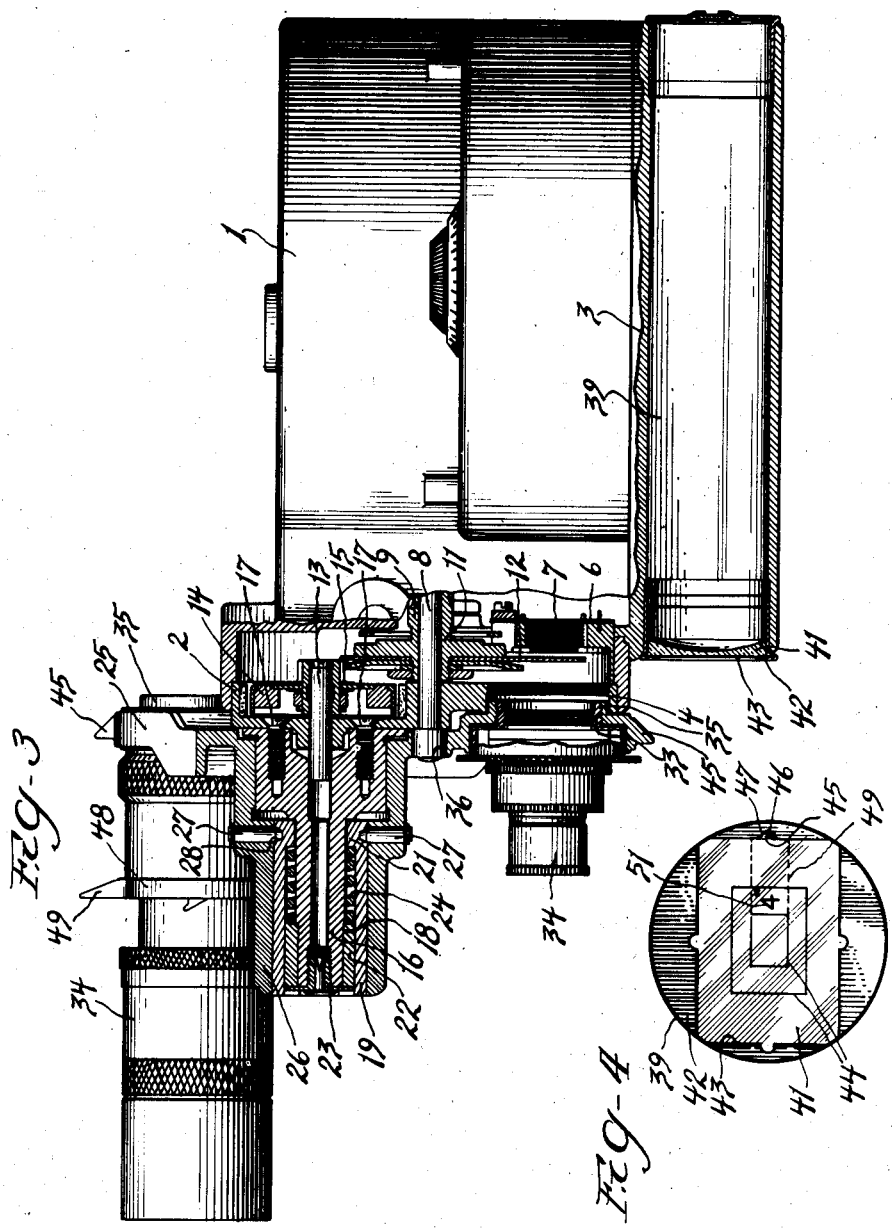
Inventor
Albert S Howell
By:— Miehle & Miehle
Atty's.

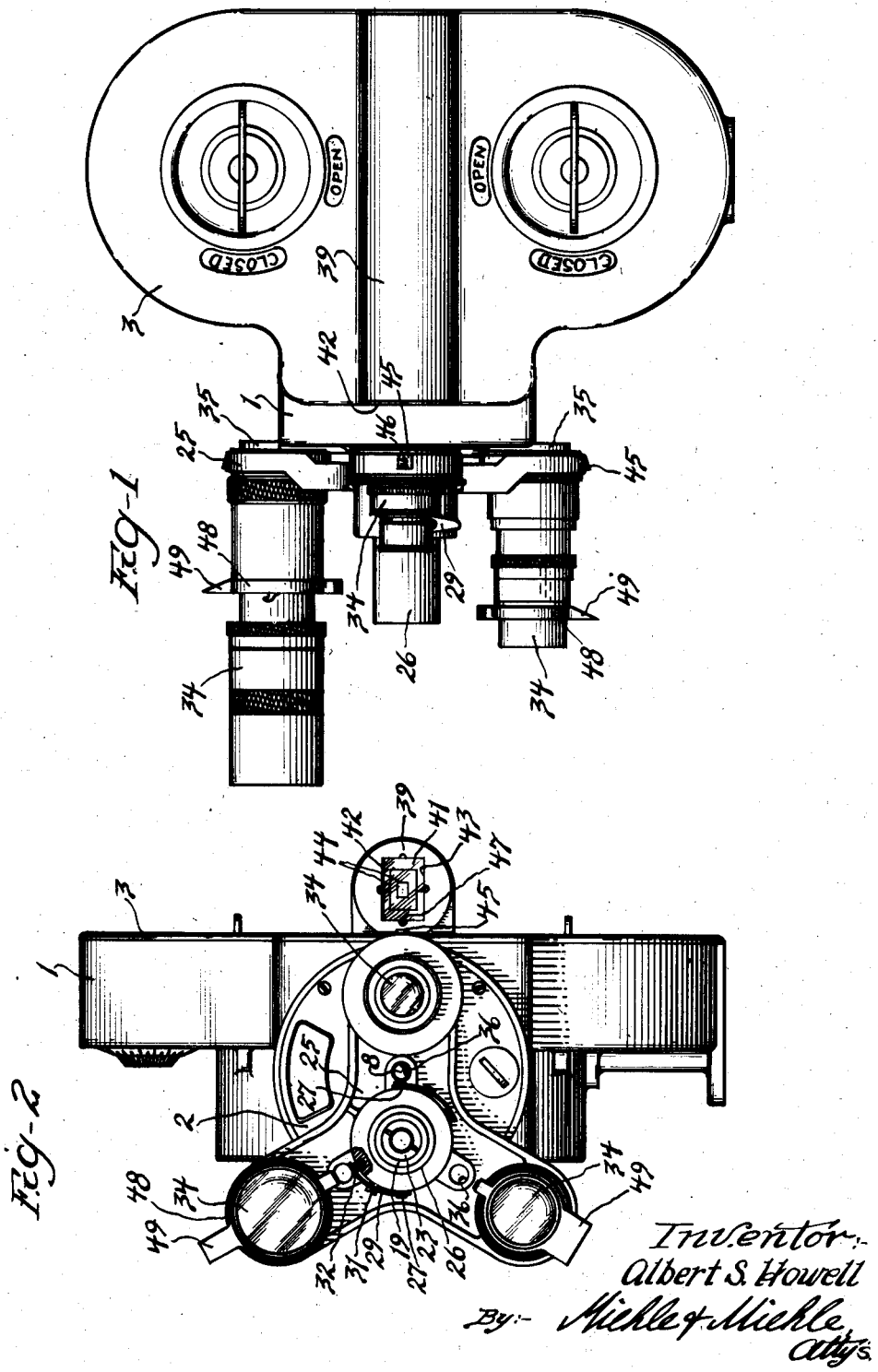

Aug. 11, 1931.  A. S. HOWELL  1,818,062
PHOTOGRAPHIC CAMERA
Filed June 9, 1928  3 Sheets-Sheet 3
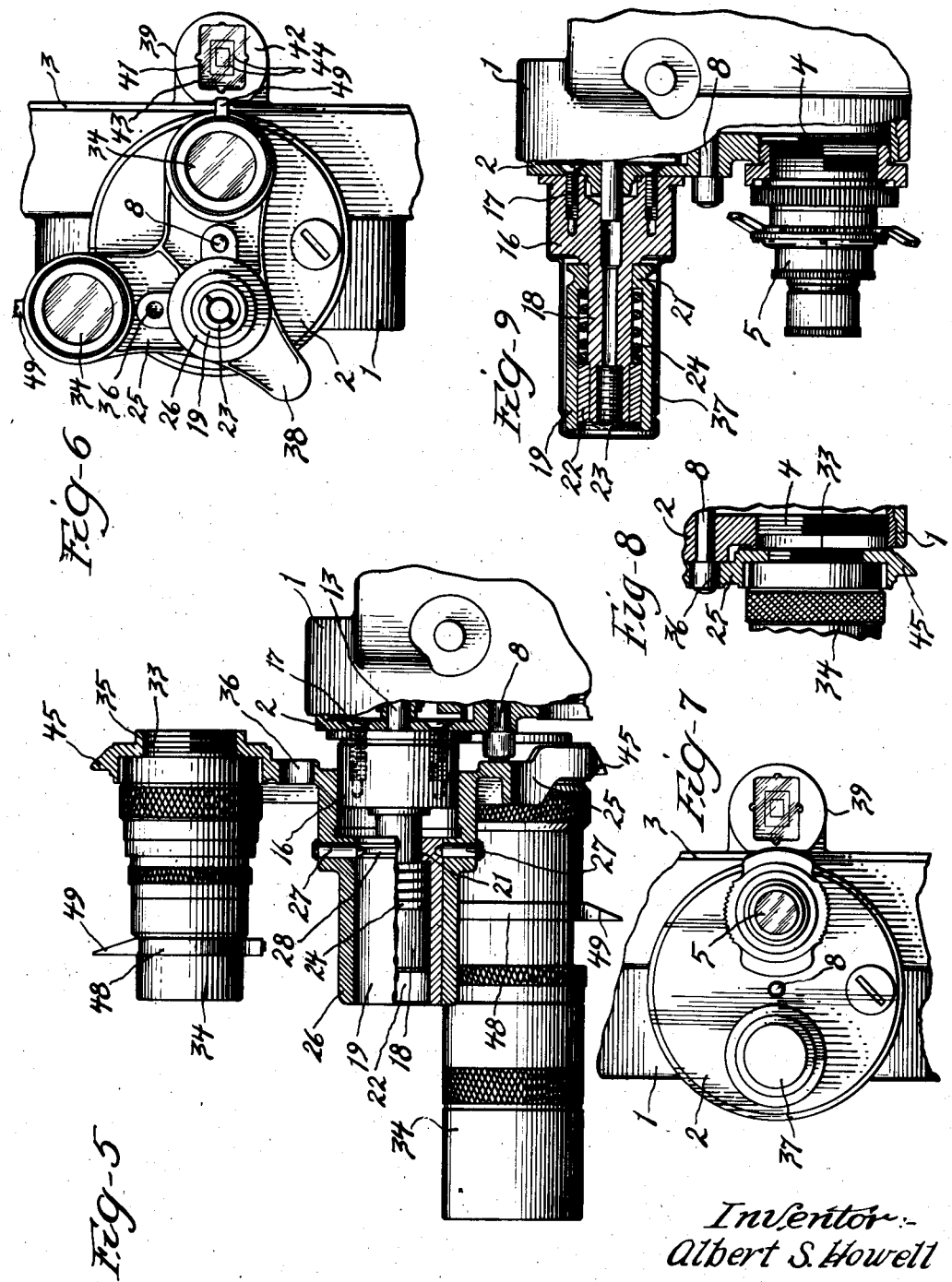
Inventor:-
Albert S. Howell
By:- Miehle & Miehle
Atty's Patented Aug. 11, 1931

1,818,062

UNITED STATES PATENT OFFICE

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS

PHOTOGRAPHIC CAMERA

Application filed June 9, 1928. Serial No. 284,206.

My invention relates to the provision of means whereby a number of photographic lenses may be selectively brought into operative position on a photographic camera with ease and convenience and without necessitating interchanging the lenses in the usual lens mounting of the camera.

One of the objects of the invention resides in the provision of such a device which is adapted to existing types of photographic cameras without necessitating extensive alteration of the structure thereof and particularly to a certain motion picture camera of the field or outdoor type, and preferably with a view toward the provision of such a device which is adapted for the convenient attachment to the camera and detachment therefrom of the lens carrier member of the device.

Another object of the invention resides in the provision of such a device which provides for the selective positioning of the several photographic lenses in operative position quickly, conveniently and with precision, means being provided for locking the lenses in operative position against accidental displacement thereof.

Other objects of the invention reside in the provision of means whereby the photographic lens which is in operative position on the camera is indicated in the view finder of the camera, and whereby the photographic field of the lens which is in operative position on the camera is indicated in the view finder of the camera.

With these objects in view my invention consists in certain features of novelty in the construction, combination and arrangement of parts by which the said objects and certain other objects hereinafter appearing are effected, all as fully described with reference to the accompanying drawings and more particularly pointed out in the claims.

In the said drawings—

Figure 1 is a side elevation of a motion picture camera embodying my invention;

Figure 2 is a front elevation of the same;

Figure 3 is a top plan view of the same with portions thereof broken away and shown in section on the horizontal plane of the focal axis of the camera;

Figure 4 is a view through the view finder of the camera;

Figure 5 a partial top plan view with portions thereof broken away and shown in section on the horizontal plane of the focal axis of the camera and showing parts in positions different from those in which they are shown in Figure 3;

Figure 6 is a partial front elevation of the camera embodying my invention in a different form from that in which the invention is shown in the previous figures;

Figure 7 is a partial front elevation of the camera with the lens carrier member, hereinafter described, removed and with the camera ready for operation;

Figure 8 is a partial section of the form shown in Figure 6 taken on the horizontal plane of the focal axis of the camera; and Figure 9 is a partial top plan view of the structure shown in Figure 7 with parts broken away and shown in section on the horizontal plane of the focal axis of the camera.

Like characters of reference indicate like parts in the several views.

Referring to the drawings, 1 designates generally a motion picture camera casing provided with a circular front opening in which is secured a circular front piece 2, and with a side opening which is closed by a door or cover 3. See Figures 1, 2 and 3.

The front piece 2 is provided adjacent the door 3 with a circular internally screw threaded lens opening 4 disposed on the focal axis of the camera and adapted for the removable mounting of a photographic lens 5 therein in a usual manner as shown in Figure 9.

Disposed within the casing 1 and spaced rearwardly from the lens opening 4 is an intermittent film feed guide which includes a front face guide plate 6 provided with an exposure aperture 7 which with the lens opening 4 is disposed on the focal axis of the camera. See Figure 3.

The axis of the lens opening 4 is disposed on the horizontal plane of the axis of the front piece 2 and in parallelism therewith, and disposed on the axis of the front piece and extending through and secured in an axial bore of the front piece is a stud 8 which extends rearwardly therefrom within the camera casing. Revolubly mounted on this stud rearwardly of the front piece is a bored hub member 9 which is driven from the camera driving mechanism.

Carried on the hub member 9 for rotation therewith is an intermittent feed cam formation 11, forming a part of the intermittent feed mechanism for intermittently feeding a film through the intermittent feed guide including the guide plate 6, and a revolving shutter 12, disposed at the rear of the front piece, is secured on the hub 9 and is timed to interrupt the passage of light to the exposure aperture 7 during the intermittent feeding of the film in the intermittent feed guide.

Disposed on an axis parallel to the focal axis of the camera and disposed on the side of the axis of the shutter 12 opposite that on which the focal axis is disposed, is a stud 13 which extends through and is secured in a bore through the front piece 2. Revolubly mounted on the inner portion of the stud 13 is the rotating element 14 of a speed governor which is driven from the hub 9 by gearing 15 to control the speed of the camera mechanism.

The stud 13 is extended forwardly of the front piece 2, and a concentrically bored stud 16 has the bore thereof engaged on the forwardly extending portion of the stud 13 and has its rear end secured against the front face of the front piece 2 by means of headed screws 17 passing through apertures in the front piece and screwthreaded into the stud 16, the rear end of the stud 16 being of a diameter to provide for the spacing of the screws 17 and to provide an engagement of suitable extent with the front piece.

As so secured to the camera the stud 16 on the exterior thereof projects forwardly therefrom in coaxial relation with the stud 13 and in parellelism with the axis of the stud 8 and shutter 12 and with the axis of the lens opening 4 and the focal axis of the camera.

The forward portion of the stud 16 is reduced, as designated at 18, and a sliding sleeve 19 encircles said reduced portion 18 of this stud and has the rear portion of its bore reduced, as designated at 21, and engaged on the portion 18. A collar 22 is secured on the extreme forward end of the stud 16, which is further reduced to form a shoulder, by means of a headed screw 23 screw-threaded into the forward end of the bore of the stud 16 and clamping the collar between its head and the shoulder of the stud 16 just mentioned.

The collar 22 engages the forward portion of the bore of the sleeve 19 and cooperates with the reduced bore portion 21 for slidably and rotatably carrying the sleeve on the forward reduced portion 18 of the stud 16. A coiled compression spring 24 is disposed within the bore of the sleeve 19 and encircling the portion 18 of the stud 16 abuts the collar 22 and the shoulder formed by the rearward reduced bore portion 21 of the sleeve 19 whereby the sleeve 19 is yieldably urged rearwardly into the rearward position thereof, shown in Figures 3 and 9.

A bored carrier member 25 is provided with a bored hub 26 and is revolubly carried on the stud 16 by means of the rearward portion of the bore thereof engaging the rear portion of the stud 16 and the forward somewhat reduced portion of the bore thereof engaging the sleeve 19.

As so carried, the hub 25 is removable over the forward end of the stud 16. Radially disposed and operable pins 27 are mounted in diametrically opposite transverse bores through the wall of the hub 26 and are engageable in inward positions thereof in a circumferential groove 28 on the sleeve 19 to longitudinally fix the carrier member 25 with the sleeve to prevent forward removal of the carrier member and to yieldably urge the carrier member to a rearward position by means of the spring 24 acting through the sleeve 19.

Outward movement of the pins 27 effects disengagement of the same from the groove 28 for the forward removal of the carrier member 25, and the pins 27 are held in engagement with said groove in the following manner. See Figures 1, 2 and 3. Curved arms 29 extend about the exterior of the hub 26 and are intermediately fulcrumed thereon, as designated at 31. Ends of the arms 29 are engaged with the outer ends of the pins 27 so that pivotal movement of the arms effects longitudinal movement of the pins to engage and disengage the groove 28. Seated in blind bores extending inwardly from the outer surface of the hub 26 are coiled compression springs 32, see Figure 2, which underlie and abut the other ends of the arms 29 whereby to yieldably urge the pins 27 inwardly and to maintain the same in engagement with the groove 28.

Inward movement of the ends of the arms 29 engaged by the springs 32 effects outward movement of the opposite ends of these arms and with them the pins 27 whereby to release the pins from the groove 28 for the forward removal of the carrier member, the mounting of the carrier member 25 on the stud 16 obviously involving rearward movement of the carrier member with the pins 27 held in their outer positions while passing over the forward end of the sleeve after which they may be released to engage in the groove 28 when they register therewith.

The carrier member 25 is preferably in the form of a spider having angularly spaced arms radiating from the hub 26 thereof, and the outer extremities of these arms are provided with internally screwthreaded lens mount apertures 33 disposed in corresponding angularly spaced relation and adapted to have photographic lenses 34 mounted therein, see Figures 1, 2, 3 and 5, the lens mount apertures being so disposed that they and the lenses mounted therein may be selectively brought into registry with the lens opening 4 and accordingly the focal axis of the camera with angular movement of the carrier member 25, whereby lenses of varying characteristics mounted on the carrier member may be quickly and conveniently brought into operative position.

The carrier member 25 is axially movable along the stud 16 and in parallelism with the focal axis of the camera, the spring 24 yieldably urging the carrier member rearwardly as before described, and, preferably as shown in Figures 1, 3 and 5, exteriorly shouldered circular formations 35, on the carrier member and extending rearwardly therefrom in coaxial relation with the lens mount apertures 33, are engageable in the lens opening 4 with rearward movement of the carrier member, see Figure 3, for such purposes as light trapping and maintaining the carrier member in lens registering positions, and are disengageable from said lens opening 4 with forward movement of the carrier member to permit angular movement thereof, see Figure 5, the photographic lenses being properly positioned axially with respect to the exposure aperture 7 when the carrier member is in its rearward position.

The hereinbefore mentioned stud 8 extends a short distance forwardly from the front piece 2 and engages the rear face of the carrier member 25 when the carrier member is out of its lens registering positions to maintain the carrier in a forward position against the influence of the spring 24. See Figure 5. The carrier member 25 is provided with angularly spaced apertures 36 therethrough disposed corresponding with the lens mount apertures 33 and adapted to engage over the stud 8 when the carrier member is in its lens registering positions to permit movement of the carrier member to its rearward position under the influence of the spring 24. See Figure 3. The arrangement is such that the stud 8 engages in the apertures 36 previous to engagement of the circular formations with the lens opening 4, so that the carrier member is located in its lens registering positions independently of the circular formations whereby the circular formations are registered with the lens opening 4 previous to engagement therein.

It is apparent that when it is desired to use but one lens the carrier member 25 may be quickly removed from the camera and a desired lens mounted in the lens opening 4 of the camera as shown at 5 in Figures 7 and 9, a removable cover 37 being placed over the stud 16 and related parts to protect the same and improve the appearance thereof.

Another form of the carrier member 25 is shown in Figures 6 and 8, which includes only two lens mounts for two lenses 34 thereon and a radially extending operating arm 38. In this form the previously described circular formations 35 are omitted, and the rear face of the carrier member about the lens mount apertures 33 thereof simply overlie the forward surface of the camera about the lens opening 4 thereof to exclude light.

A view finder 39 is carried on the door 3 adjacent the focal axis of the camera and disposed in parallelism therewith, and in order that the lens, on the carrier member 25, which is in registry with the focal axis thereof may be indicated in the view finder, and in order that the different photographic fields of these lenses may be indicated in the view finder when the lenses are in said registering or operative position with respect to the camera the following is provided.

The view finder 39 includes a front lens 41 immediately in front of which is a mask 42 providing a rectangular opening 43 defining the photograph field of the shortest focus lens used, which is shown in operative position in Figures 1, 2, 3, 7 and 9, and whose photographic field is comparatively large. See Figures 2, 4 and 7. Inscribed on the lens 42 are rectangular lines 44 which delineate the smaller and differing photographic fields of the other two photographic lenses 34 mounted on the carrier member as shown in Figures 1, 2, 3 and 5, and of the two lenses mounted on the carrier member 25 as shown in Figure 6.

Formed with the carrier member 25, in angularly spaced relation thereon and on radial lines thereof corresponding with the positions of the lenses 34 thereon, are radial projections 45, the outer edges of which are adapted to be observed in the view finder to register with the inner edge of the opening 43 of the mask 42, and on the rearwardly facing diagonally disposed surfaces of which are inscribed characters 46 identifying the lenses mounted in the respective lens mount apertures 25, these characters being observable through the view finder when the respective lenses are in operative position by reason of a slot 47 in the mask 42 at the inner edge of the opening 43 thereof. See Figure 4. Thus the lens, in operative position, may be ascertained by observance through the view finder.

To further identify the longer focus lenses, in operative position, through the view finder and to visually indicate in the view finder the photographic field thereof, bands 48 are secured on the bodies of these longer focus lenses upon which are formed radial projections 49, the outer edges of which are adapted to be observed in the view finder to register with the inner edges of the respective rectangular lines 44 when the respective lenses are in operative position. See Figure 4.

These radial projections 49 have characters 51 inscribed on the rearwardly facing diagonal surfaces thereof observable through the view finder to identify the respective lenses in operative position.

It will be observed that the bands 48 and the radial projections 49 thereon are disposed in spaced relation along the focal axis of the camera and that they are spaced forwardly of the projections 45, which arrangement permits the projections 49 being comparatively short, by reason of the forwardly widening field of the view finder.

While I have described my invention I do not wish to be limited to the precise details of construction shown as changes may readily be made without departing from the spirit of my invention, but having thus described my invention, I claim as new and desire to secure by Letters Patent the following:

1. The combination with a photographic camera, of a stud on the camera and projecting exteriorly thereof, a bored lens carrying member revolubly carried on the projecting portion of said stud and removable over the outer end thereof, radially disposed and operable pins on said carrying member for releasably retaining said carrying member on said stud, and spring means for maintaining said pins in retaining position and adapted for the manual movement of said pins into releasing position.

2. The combination with a photographic camera, of a stud on the camera and projecting forwardly therefrom, a bored lens carrying member revolubly carried on the projecting portion of said stud and removable over the forward end thereof, a sliding sleeve interposed between said stud and carrying member, spring means yieldably urging said sleeve in one direction along the axis of the stud, and releasable means associated with said sleeve whereby said spring urges said carrying member rearwardly and releasable to permit forward removal of the carrying member.

3. The combination with a photographic camera, of a stud on the camera and projecting forwardly therefrom, a bored lens carrying member revolubly carried on the projecting portion of said stud and removable over the forward end thereof, a slidable sleeve interposed between said stud and carrying member, a coiled compression spring encircling said stud and reacting thereon yieldably urging said sleeve rearwardly on said stud, and releasable means for longitudinally fixing said carrying member and sleeve and releasable to permit forward removal of the carrying member.

4. The combination with a photographic camera, of a stud on to the camera and projecting forwardly therefrom and having the forward portion thereof reduced, a bored lens carrying member revolubly carried on the projecting portion of said stud and removable over the forward end thereof and having the bore thereof engaged thereon rearwardly of said reduced portion, a slidable sleeve carried on said stud and interposed between the forward reduced portion of said stud and the carrying member, a coiled compression spring encircling the forward reduced portion of said stud and yieldably urging said sleeve in one direction along said stud, and releasable means associated with said sleeve whereby said spring urges said carrying member rearwardly and releasable to permit forward removal of the carrying member.

5. The combination with a photographic camera, of a stud on the camera and projecting forwardly therefrom and having the forward portion thereof reduced, a bored lens carrying member revolubly carried on the projecting portion of said stud and removable over the forward end thereof and having the bore thereof engaged thereon rearwardly of said reduced portion, a slidable sleeve interposed between the forward reduced portion of said stud and the carrying member and engaging the bore of said carrying member and having the rear portion of its bore reduced and engaged on said reduced portion of the stud, a collar secured on the front end of said stud and engaging the bore of said sleeve, a coiled compression spring within the bore of said sleeve and encircling said reduced portion of said stud and abutting said collar and the shoulder formed by the rearward reduced portion of the bore of said sleeve to urge the sleeve rearwardly, radially disposed and operable pins on said carrying member and engaging a circumferential groove on said sleeve to longitudinally fix the carrying member with the sleeve, spring means yieldably urging said pins into engagement with said groove and adapted for manual operation of the pins to disengage from said groove.

6. The combination with a motion picture camera provided with an interior revolving light shutter disposed on an axis in parallelism with the focal axis of the camera, of a carrier member mounted on and in front of the camera for movement in parallelism with said focal axis and for angular movement on an axis parallel to said focal axis and disposed on the side of the shutter axis opposite that on which said focal axis is disposed to selectively register photographic lenses, mounted on the carrier member in angularly spaced relation, with said focal axis, a stud on said camera and projecting forwardly therefrom and disposed coaxially with said shutter and engageable with rearward movement of said carrier member in apertures angularly spaced on said carrier member to locate the carrier member in its lens registering positions and disengageable from these apertures with forward movement of the carrier member, and means normally maintaining said carrier member in its rearward lens registering positions.

7. The combination with a photographic camera provided with a lens opening, of a carrier member mounted on the camera for movement axially of said lens opening and for angular movement on a correspondingly extending axis to selectively register photographic lenses mounted in spaced relation thereon with said lens opening, circular formations on said carrier member disposed for engagement and disengagement, in the lens registering positions of the carrier member, with said lens opening with opposite movements of the carrier member axially of said lens opening, and means for maintaining said carrier member in any of its circular formation lens opening engaged positions and adapted to permit movement thereof out of the same.

8. The combination with a photographic camera provided with a front lens opening, of a carrier member mounted on and in front of the camera for movement axially of said lens opening and for angular movement on an axis parallel to that of the lens opening and provided with internally screw-threaded lens mount apertures disposed in angularly spaced relation thereon for selective registration with said lens opening with angular movement of the carrier member, exteriorly shouldered circular formations on said carrier member and extending rearwardly therefrom in coaxial relation with said lens mount apertures and engageable in said lens opening with rearward movement of the carrier member and disengageable therefrom with forward movement thereof, and spring means yieldably urging said carrier member rearwardly.

9. The combination with a photographic camera provided with a lens opening, of a carrier member mounted on the camera for movement axially of said lens opening and for movement to selectively register photographic lenses mounted in spaced relation thereon with said lens opening, circular formations on said carrier member disposed for engagement and disengagement, in the lens registering positions of the carrier member, with said lens opening with opposite movements of the carrier member axially of said lens opening, means operative to locate said carrier member in its lens registering positions previous to engagement of said circular formations with said lens opening, and means normally retaining said carrier member in any of its circular formation lens opening engaging positions.

10. The combination with a photographic camera provided with a front lens opening, of a carrier member mounted on and in front of the camera for movement axially of said opening and for angular movement on a correspondingly extending axis to selectively register photographic lenses mounted in angularly spaced relation thereon with said lens opening, circular formations on said carrier member disposed for engagement, in the lens registering positions of the carrier member, with said lens opening with rearward movement of the carrier member and for disengagement from said lens opening with forward movement of said carrier member, means for locating said carrier member in its lens registering positions and adapted to prevent rearward movement of said carrier member when out of its lens registering positions, and means for maintaining said carrier in a rearward circular formation lens opening engaging position and adapted to permit forward movement thereof.

11. The combination with a photographic camera provided with a front lens opening, of a carrier member mounted on and in front of the camera for movement axially of said lens opening and for angular movement on an axis parallel to that of the lens opening and provided with internally screw-threaded lens mount apertures disposed in angularly spaced relation thereon for selective registration with said lens opening with angular movement of the carrier member, exteriorly shouldered circular formations on said carrier member and extending rearwardly therefrom in coaxial relation with said lens mount apertures and engageable in said lens opening with rearward movement of the carrier member and disengageable therefrom with forward movement thereof, aperture engaging stud locating means engageable with rearward movement of said carrier member to locate said carrier member in its lens registering positions and disengageable with forward movement of the carrier member and adapted to maintain the carrier member in a forward position when the carrier member is not in a lens registering position, and spring means yieldably urging said carrier member rearwardly.

In witness whereof I hereunto affix my signature this 28th day of May, 1928.

ALBERT S. HOWELL.